June 25, 1957     W. F. ALTENPOHL, JR     2,797,003
POULTRY HANDLING DEVICE

Filed Jan. 28, 1954     2 Sheets-Sheet 1

William F. Altenpohl, Jr.
INVENTOR.

June 25, 1957    W. F. ALTENPOHL, JR    2,797,003
POULTRY HANDLING DEVICE
Filed Jan. 28, 1954    2 Sheets-Sheet 2
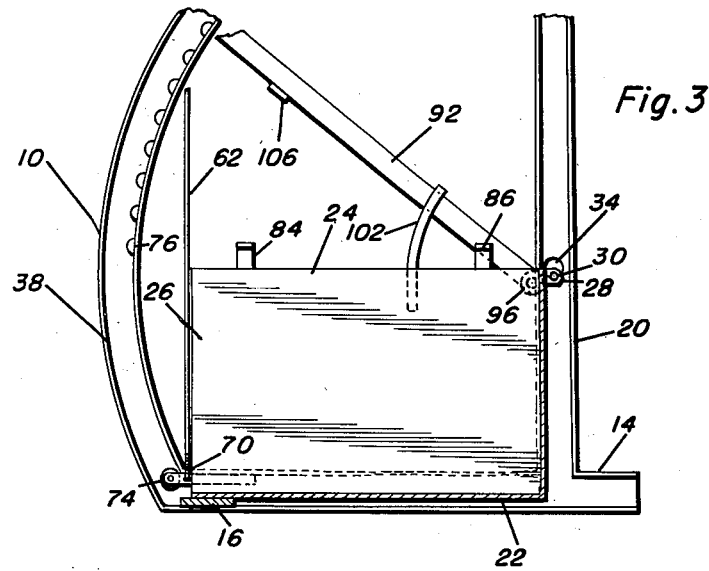
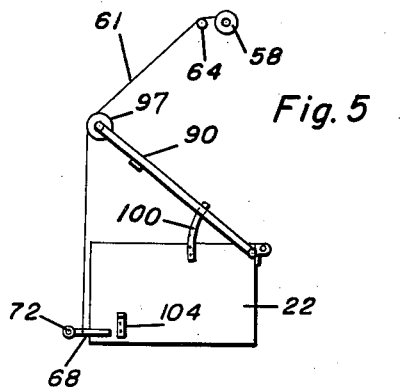
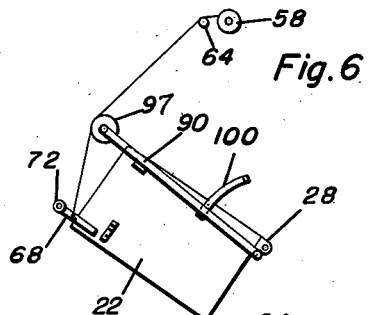
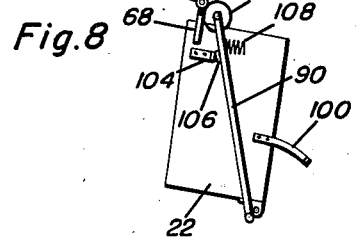
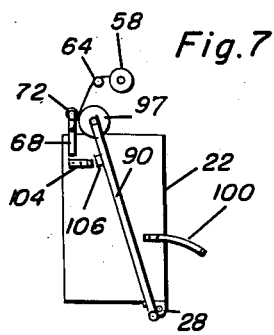
William F. Altenpohl, Jr.
INVENTOR.

United States Patent Office 2,797,003
Patented June 25, 1957

2,797,003

POULTRY HANDLING DEVICE

William F. Altenpohl, Jr., Philadelphia, Pa.

Application January 28, 1954, Serial No. 406,651

3 Claims. (Cl. 214—308)

This invention relates to a poultry handling device, and particularly to a device for dumping poultry from the filling tanks.

In the operation of killing and dressing poultry, it is customary to provide relatively large tanks and to pack the carcasses in the tanks between various operations. Particularly is it customary to pack finished carcasses in so-called chilling tanks and to thoroughly cool the carcasses before wrapping or otherwise preparing for shipment. Heretofore, it has been customary to place the chilling tank adjacent the package conveyor or table and remove the poultry therefrom by hand.

The present device provides a dumping device for taking the tank of poultry and rotating it about the upper edge of the tank while vibrating the tank to release the poultry therefrom so that it will flow substantially continuously from the tank as the tank is rotated about its edge. The tank may be adjacent a packing table so that the various handlers may grab the poultry as it is fed from the tank or the tank may be dumped onto any suitable conveyor so that the carcasses will be conveyed along to a plurality of packers or other utilizing people.

In a construction according to the device, a platform is provided with a framework on which a driving motor is mounted and in which a tank holder is pivoted so that a tank may be inserted into the holder and mechanically rotated about its upper edge, and a suitable vibrating device is connected to the tank holder so that the tank will be vibrated and cause a substantially continuous flow of poultry carcasses from the tank instead of the spasmodic punch flow that would occur if the tank were tipped without being vibrated.

It is accordingly an object of the present invention to provide an improved poultry tank dumping device.

It is a further object of the invention to provide a power operated tank dumper.

It is a further object of the invention to provide a dumping device having vibrating means therein.

Other objects and many of the attendant advantages of the present invention will be apparent from the following detailed description taken in conjunction with the accompanying drawings in which:

Figure 3 is an enlarged sectional elevation taken substantially on the plane indicated by the section line 3—3 of Figure 2 and with parts broken away and in section;

Figures 5, 6, 7 and 8 show progressive stages of the operation of the tank dumper.

Figure 1:
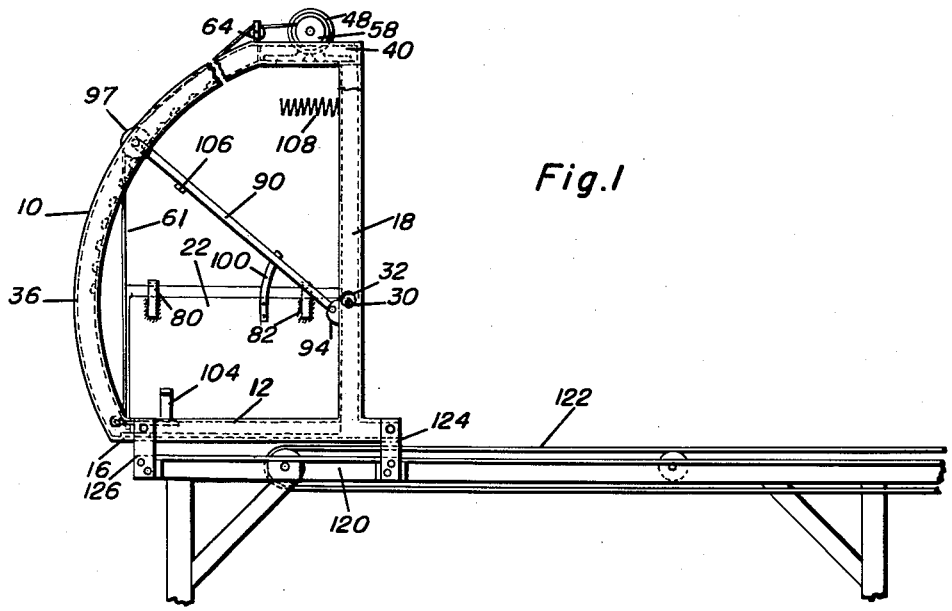
Figure 1 is a side elevation of the poultry handling device according to the invention.
Figure 2:
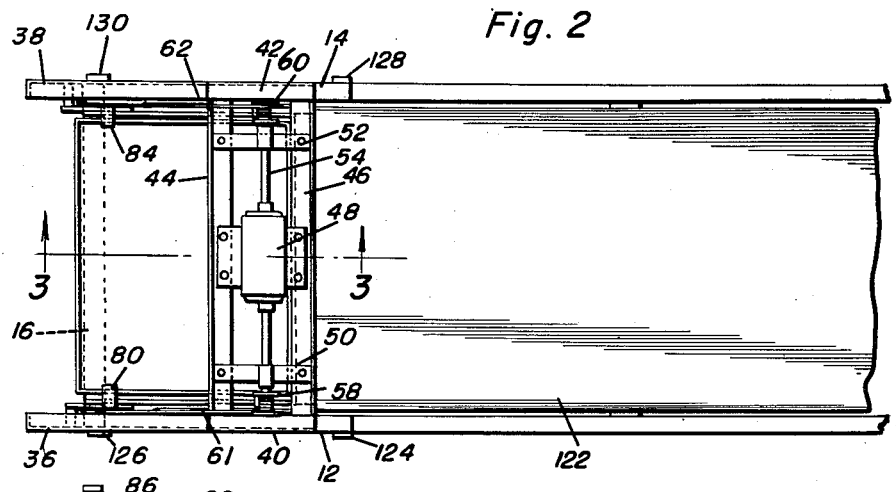
Figure 2 is a top plan view of the device with portions broken away to show the construction.
Figure 4:
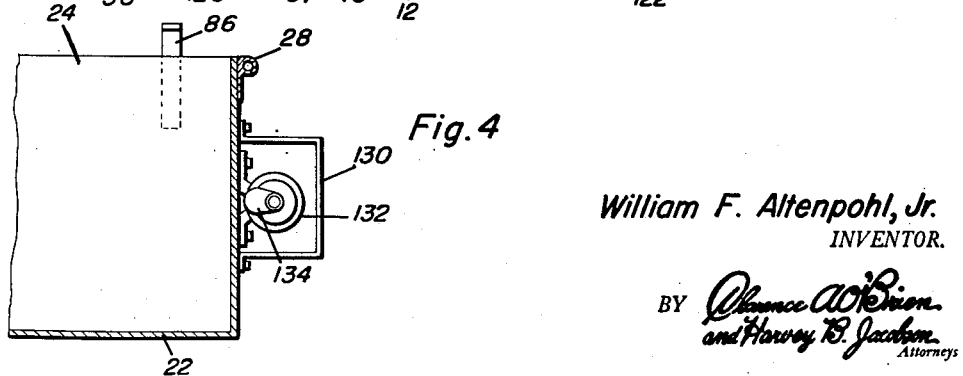
Figure 4 is a modification showing a modification of a vibrating device according to the invention.

In the exemplary embodiment according to the invention, a frame indicated generally at 10 is provided with bottom flanges 12 and 14 which are rigidly connected together by means of a base plate 16. A pair of upstanding channels 18 and 20 are mounted on the bottom members 12 and 14, respectively, and are upstanding therefrom and preferably are rigidly or integrally connected thereto and are herein shown as made of channel members, as are the base members 12 and 14.

A substantially open box-like tank holder 22 is mounted on the base plate 16 and extends between the standards 18 and 20. The box holder 22 is provided with an open top 24 and an open end 26. The tank holder 22 is provided adjacent the upper corner thereof with spaced apart ears 28 through which extends a dumping axle 30 which extends through apertures 32 and 34 in the columns 18 and 20, respectively. The apertures 32 and 34 are materially greater in size than the axle 30 for a purpose presently to be described.

Spaced apart arcuate tracks 36 and 38 are integrally connected in the framework 10 and extend from the bottom members 12 and 14 to the top of the column members 18 and 20. Arcuate members 36 and 38 terminate in substantially flat top sections 40 and 42 which provide connection for cross-pieces 44 and 46 which provide a platform on which is mounted a suitable driving motor 48. Bearing standards 50 and 52 affixed between the cross-members 44 and 46 and an axle 54 driven by the motor 48 extends through each of the bearing members 50 and 52 and is properly journaled therein. A pair of drums 58 and 60 are mounted on the opposite ends of the shaft 54 and substantially adjacent to the flat upper ends of the track members 36 and 38.

Flexible tension members 61 and 62 which pass through guiding sheaves 64 mounted on the cross-piece 44 and adjacent to the arcuate track means 36 and 38 extend downwardly and connect to the lower edge of the tank at a position diametrically opposite from the pivot axle 30 connected to the tank holder frame. The tank holder is provided with projecting arms 68 and 70 which are connected to the box-like member 22 and extend longitudinally therefrom adjacent the bottom rear corner thereof. Each of the arms 68 and 70 is provided with a roller 72 and 74, respectively, which are entrained in the arcuate track members 36 and 38. The track members 36 and 38 are provided with a roughness in the form of projections or bumpers 76 so that when the rollers 72 and 74 travel in the tracks 36 and 38, the rollers will encounter the bumpers 76 and cause a vibration of the tank holder 22 and consequently of any tank mounted therein. The large apertures 32 and 34 allow the axle 30 to move about therein so that the motion of the rollers 72 and 74 over the bumpers 76 will cause the vibration of the tank so that the axle 30 will move about in the apertures 34 to permit the free vibration thereof.

The tank holder 22 is provided with upstanding fingers 80 and 82 and on the opposite sides with upstanding fingers 84 and 86 which have inturned top members for retaining a poultry tank in the tank holder. The rear end 26 of the tank holder is left open so that the tanks may be readily slid into or withdrawn from the tank holder 22.

To control the application of the flexible members 61 and 62 to the tank holder, lever arms 90 and 92 are pivotally mounted on ears 94 and 96 which are mounted on the standards 18 and 20 in proximity to but spaced below and behind the apertures 32 and 34. Sheaves 97 are mounted on the lever arms 90 and 92 and fixed at a position such that the sheaves 97 are substantially vertically disposed above the back end of the tank holder when the arms 90 and 92 are properly positioned with respect to the tank holder 22. In order to secure this position, the tank holder is provided with a plurality of contact fingers 100 and 102 which have inturned end portions to limit the vertical angular displacement with respect to the tank 22 so that the arms 90 and 92 will not exceed a predetermined angular relation therewith.

The tension members 61 and 62 are entrained over the sheaves 97 so that the portions of the flexible members 61 and 62 joined to the tank holder 22 are substantially vertical with respect to the bottom of the tank holder.

Stop members 104 are mounted on the ends of the tank holder 22 and extend outwardly to engage an abutment 106 on the lever arms 90 and 92 so that the tank holder will not pass through the lever arms 90 and 92. On the other hand, the upward motion of the tank holder 22 will carry the arms 90 and 92 therewith so as to engage a resilient abutment 108.

The handling device is shown as mounted on the platform 120 of a conveyor having a belt 122 by means of bracket members 124 and 126 and members 128 and 130. However, it will be obvious that the device may be mounted on any suitable platform, truck or other device where it may be desired to dump the tanks of poultry or other material.

Instead of providing the tracks 36 and 38 with bumpers 76, the housing 130 may be placed on the holder 22 and a suitable vibrator, such as a motor 132 having an offset weight 134 may be rigidly attached to the tank holder 22 for producing the desired vibration thereof. This latter device will be particularly useful when it is desired to raise the tank holder at a very low rate of speed in order to produce a slow flow of poultry from the tank to the conveyor or work table.

In the operation of the device according to the invention, the tank holder 22 will be positioned as shown in Figure 5 with the fingers 100 and 102 contacting the arms 90 and 92 to bring the arms 90 and 92 into position so that the sheaves 97 are vertically above the lower bottom rear corner of the tank holder 22. In the operation of the device, a tank of poultry or other material is slid into the holder 22 and retained against movement thereof by means of the ears 80 to 86 and the motor started by any suitable means. Tension members 61 and 62 will then move onto the drums 58 and will pass over the sheaves 97 on the ends of the arm 90. Fingers 100 and 102 will prevent the arms 90 and 92 from moving beyond the predetermined angular relation so that the pull of the tension members 61 and 62 will be substantially perpendicular to the base of the device 22. When the arms 90 and 92 have moved to a position approximately under the guide sheave 64, there will no longer be any tension pulling the arms 90 and 92 upward, and the tank holder 22 will continue to be pulled by remaining portions of tension members 61 and 62 and move and pass through the lever arms 90 and 92 until the stops 104 contact the lever arms 90 and 92 after which the lever arms will be pushed against the stop members 108 as shown in Figure 8, and preferably, a suitable limit device (not shown) will stop the motor 48 so that the drum 58 will be released and the resilient members 108 will push the arms 90 and 92 downwardly so that the tank holder and the tank will then fall by gravity to the position orginially shown in Figure 5. This is possible because the tension members are connected to the lower edge of the tank and when the guide sheaves 64 and 97 are vertically aligned, the tension members can still be wound further on the drums 58 and 60 until the tank assumes the position as shown in Figure 8. As the rollers 72 move upward in the tracks 36 and 38, the bumpers 76 will cause a vibration of the holder 22 and consequently the tank received therein so that the material contained in the tank will be steadily removed therefrom instead of allowed to fall in batches as would happen if the tank were not vibrated.

While for purposes of exemplification, a particular embodiment of the invention has been shown and described according to the best present understanding thereof, it will be apparent to those skilled in the art that various changes and modifications can be made in the construction and arrangement of the parts thereof without departing from the true spirit of the invention.

What is claimed as new is as follows:

1. A device for dumping dressed poultry from a tank comprising a tank holder, a frame, said frame including a pair of standards, the top edge of said tank holder being pivoted between said standards, a motor driven drum mounted on said standards, a flexible tension means secured on said drum and attached to said tank holder at a point diagonally opposite to said pivotal edge, an arm fixed on said tank holder, an arcuate track concentric with the pivoted edge of said tank holder, a roller on said arm engaged on said track, said arcuate track being provided with a roughened surface to produce vibration of said holder as said roller advances along said track.

2. A device for dumping dressed poultry from a tank comprising a tank holder, a frame, said frame including a pair of standards, the top edge of said tank holder being pivoted between said standards, a motor driven drum mounted on said standards, a flexible tension means secured on said drum and attached to said tank holder at a point diagonally opposite to said pivotal edge, an arm fixed on said tank holder, an arcuate track concentric with the pivoted edge of said tank holder, a roller on said arm engaged on said track, said arcuate track being provided with a roughened surface to produce vibration of said holder as said roller advances along said track, a lever arm pivoted to said standards adjacent the upper pivoted edge of said holder, a sheave mounted on said lever arm, said flexible tension means being entrained over said sheave.

3. A device for dumping tanks of dressed poultry comprising a frame including a base and a pair of spaced apart standards, a tank holder, the upper edge of said tank holder being pivotally mounted between said standards, an arcuate track extending between said base and said standards, said track being concentric with the pivot axis of said tank holder, a roller mounted on said tank holder and engaged on said track, a motor driven winch mounted on said standards, a flexible tension element secured on said drum and secured to said tank holder at a point remote from the pivot axis of said holder, a lever arm pivoted on said standards in proximity to the pivot axis of said tank holder, a finger on said tank holder engageable with said lever arm to limit the maximum angular relation of said lever arm with said tank holder, a sheave journalled on said lever arm, said flexible tension member being entrained over said sheave, said sheave being positioned to maintain said tension element substantially perpendicular to said tank holder, a stop on said tank holder engageable with said lever arm, a resilient stop interposed between said standards and said lever arm, said track having projections engageable by said roller for imparting vibration to said tank holder.

References Cited in the file of this patent

UNITED STATES PATENTS

| | | |
|---|---|---|
| 781,690 | Stickney | Feb. 7, 1905 |
| 1,917,709 | Griffith et al. | July 11, 1933 |
| 1,955,983 | Stebler et al. | Apr. 24, 1934 |
| 2,129,394 | Allen | Sept. 6, 1938 |
| 2,388,987 | Morrison | Nov. 13, 1945 |
| 2,409,121 | Fritschle | Oct. 8, 1946 |
| 2,648,298 | Holbeck | Aug. 11, 1953 |